United States Patent Office 3,764,349
Patented Oct. 9, 1973

3,764,349
FLAVORING PROCESS USING OXYCYCLIC
PYRAZINES
Braja D. Mookherjee, Matawan, N.J., and Muus G. J.
Beets, Hilversum, Netherlands, assignors to International Flavors & Fragrances Inc., New York, N.Y.
No Drawing. Original application Apr. 17, 1970, Ser. No. 29,639, now Patent No. 3,684,809, dated Aug. 15, 1972. Divided and this application Sept. 9, 1971, Ser. No. 179,163
Int. Cl. A23l 1/26; C07d 51/76
U.S. Cl. 426—65
5 Claims

ABSTRACT OF THE DISCLOSURE

Processes for altering the flavors of products, including foodstuffs and tobaccos, which comprise adding thereto a small but effective amount of at least one oxycyclic pyrazine having the formula

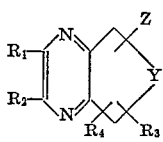

wherein Y is —$CH_2$— or —$CH_2$—$CH_2$—; Z is a carbonyl oxygen, a hydroxyl group, or an acyloxy group; and $R_1$, $R_2$, $R_3$, and $R_4$ are the same or different and represent hydrogen, alkyl, or alkylene; the products so produced; flavoring and flavor-enhancing compositions containing such oxycyclic pyrazines; and novel oxycyclic pyrazines and processes for their production.

---

This application is a division of our parent application Ser. No. 29,639, filed Apr. 17, 1970, now United States Letters Patent 3,684,809.

BACKGROUND OF THE INVENTION

The present invention relates to oxycyclic pyrazines and their use in processes and compositions for altering the flavors of various materials such as tobaccos, foodstuffs, and the like, as well as the novel pyrazines and processes for producing them.

Because of the tremendous consumption of foods, tobaccos, and other materials, there has been an increasing interest in substances and methods for imparting flavors to such consumable materials. This interest has been stimulated not only because of the inadequate quantity of natural flavoring materials available, but perhaps even more importantly, because of the need for materials which can combine several nuances, will be more stable than natural materials, will blend better with other flavors or flavoring composition components, and will generally provide superior products.

There have recently been suggestions that certain pyrazine derivatives have flavors which might be useful in foods and other consumable materials. For example, tetramethylpyrazine has been used with vanillin in chocolate flavors, acetylpyrazine has been used in tobacco and foods, and methoxypyrazine has been said to impart a nut-like flavor to foods.

THE INVENTION

It has now been found that heretofore unknown oxycyclic pyrazines are capable of imparting a wide variety of flavors to various consumable materials. Briefly, the invention contemplates altering the flavors of such consumable materials by adding thereto a small but effective amount of at least one oxycyclic pyrazine having the formula

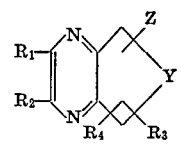

wherein Y represents —$CH_2$— or $CH_2$—$CH_2$—; Z is a carbonyl oxygen, a hydroxyl group, or an acyloxy group; and $R_1$, $R_2$, $R_3$, and $R_4$ represent hydrogen, alkyl, or alkylene and are the same or different. The invention also contemplates flavoring and flavor-enhancing compositions containing such pyrazines, as well as the novel pyrazines and the processes for preparing them.

More specifically, the oxycyclic pyrazines according to this invention are pyrazines to the "b" side of which are fused five- and six-membered oxygen substituted rings, such as cyclopenta and cyclohexa rings. Such rings are substituted with a hydroxy, acyloxy, or carbonyl oxygen atom and can be substituted with one or two alkyl or alkylene groups, and the pyrazine ring can also be substituted with one or two alkyl or alkylene groups. In some instances one or the other of the rings can be substituted with an alkadienyl group.

The oxygen substituent can be a carbonyl oxygen so that the novel material is a cyclic ketone or it can be hydroxy or acyloxy. The lower acyloxy groups containing from two to four carbon atoms are desirably used herein. The substituents $R_1$, $R_2$, $R_3$, and $R_4$ are preferably hydrogen or lower alkyl containing from one to six carbon atoms.

Exemplary of the oxycyclic pyrazines contemplated herein are 5-acetoxy-5,6,7,8-tetrahydroquinoxaline having the structure

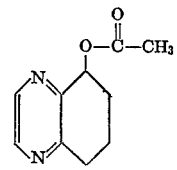

This is a pale yellow liquid having a boiling point of 128–129° C. at 0.7 mm. Hg, and $n^D{}_{25}$ of 1.5293, a popcorn-like odor, and a light popcorn flavor at two parts per million (p.p.m.) in water. All parts, proportions, ratios, and percentages herein are by weight unless otherwise stated.

Another material according to the present invention is 5-hydroxy - 5,6,7,8 - tetrahydroquinoxaline having the structure

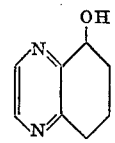

This is a white solid melting at 64.8–66.0° C. having a light, nut-like odor.

5-oxo-5,6,7,8 - tetrahydroquinoxaline having the structure

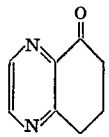

is also contemplated. This is a yellow solid having a roasted cereal aroma, and a melting point of 57.4°–59.8°C.

The novel pyrazines prepared according to the present invention can be obtained by a number of reaction routes. The acyloxy derivatives can be prepared by reacting a cyclohexapyrazine or a cyclopentapyrazine with a peracid in the presence of the corresponding lower alkanoic acid and treating the reaction product with an aliphatic carboxylic acid anhydride. The peracid can be a lower aliphatic peracid such as peracetic, perpropionic and like acids.

The aforesaid cycloalkylpyrazine can be prepared by a number of reaction routes, as for example by reacting a 2-halocycloalkane, e.g., 2-chlorocyclohexanone, or an alkyl-substituted 2-halocycloalkanone, with ethylene diamine or a 1-alkyl or a 1,2-dialkyl derivative thereof to obtain the dihydropyrazine and then dehydrogenating the pyrazine ring, as for example by passing oxygen through a solution of the pyrazine. With 2-chlorocyclohexanone and ethylene diamine, 5,6,7,8 - tetrahydroquinoxaline is produced.

The quantity of peracid used is desirably at least stoichiometric with the quantity of pyrazine derivative used so as to obtain high reaction completion. Excesses of peracid up to 20 percent can be used, but quantities in excess of this are wasteful of the reactants, complicate recovery of the product, and can produce unwanted side reactions. It is accordingly desirable to utilize peracid in quantities of from stoichiometric to a 20 percent excess.

The reaction is carried out at temperatures above 60° C. to provide desirable reaction velocities. On the other hand, temperatures above 120° C. can cause an overly vigorous reaction with the production of unwanted highly oxidized and other undesirable by-products. It is accordingly desirable to carry out the reaction at from 60° to 120° C. It has been found that good results can be obtained in the preferred temperature range of from 70° to 85° C.

This step of the reaction takes place readily. Generally, the minimum length of time is governed by the rate at which the peracid can be added without creating an excessive temperature rise, and in the usual process equipment this can be as little as about 15 minutes. On the other hand, an additional holding period after peracid addition has been completed will serve to provide high completeness, and an additional hour or two is generally sufficient for this purpose. Accordingly, this phase of the process is carried out for from about 15 minutes to about two hours.

An alkanoic acid is used as a reaction vehicle and moderator to provide better control over the process. Generally, the use of lower alkanoic acids is desirable, and acids having from two to four carbon atoms are preferred.

The alkanoic acid is preferably stripped off and the product of peracid treatment is then treated with an alkanoic acid anhydride. The anhydride used is preferably a lower alkanoic acid anhydride, that is an anhydride of an aliphatic acid having from two to four carbon atoms.

The anhydride treatment is carried out at temperatures of from 80° to 140° C. It is preferred to carry out the reaction at the reflux temperature of the anhydride.

The quantity of anhydride utilized should be at least stoichiometric with the cyclic pyrazine used, and it is desirable that excesses of from 100 to 200 percent of the anhydride be used. The treatment with anhydride is carried out for from about one to about six hours, and times of from one to two hours are preferred.

The corresponding hydroxy derivative is readily produced from the acyloxy derivative by hydrolysis with aqueous or alcoholic alkali metal hydroxide. The hydrolysis is carried out at temperatures of from about 60° to about 100° C. to provide good reaction rates and completeness in from one to four hours. The hydroxides of sodium and potassium are desirably used, and methanol is a preferred alcohol.

The corresponding ketone is conveniently produced by oxidation of the alcohol. The oxidation can be carried out in a solvent or vehicle such as dimethyl sulfoxide with a lower alkanoic anhydride such as those set forth above.

The reaction is carried out at mild temperatures of from 15° to 30° C., and preferably at 20–25° C. Times of from eight to 48 hours are used, depending upon the temperature, the reactants, the vehicle, amount of agitation and the like. Jones reagent (one mole of chromium trioxide, ⅙ mole of sulfuric acid, and acetone in an amount about five times the weight of the trioxide) can also be used as an oxidizing agent in this step.

It will accordingly be apparent to those skilled in the art that a preferred route begins with the peracid oxidation of a compound having the formula

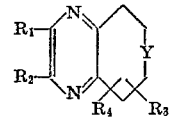

wherein $R_1$, $R_2$, $R_3$, $R_4$, Y are as set forth above, followed by treatment of the oxidation product with an alkanoic acid anhydride to provide a product having the formula

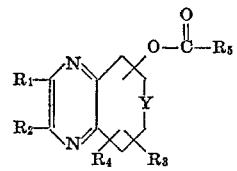

wherein $R_5$ is alkyl, preferably having one to three carbon atoms.

It will be understood by those skilled in the art that the intermediate and the final products prepared herein can be neutralized, washed, and dried to purify and cleanse the desired substances. The novel oxycyclic pyrazines can be obtained in purer form or in substantially pure form by conventional purification techniques. Thus, the products can be purified and/or isolated by distillation, extraction, preparative chromatographic techniques, and the like. It has been found desirable to purify the oxycyclic pyrazines by fractional distillation under vacuum.

It will be appreciated from the present disclosure that the oxycyclic pyrazines and mixtures thereof according to the present invention can be used to alter, vary, fortify, modify, enhance, or otherwise improve the flavor of a wide variety of materials which are ingested, consumed, or otherwise organoleptically sensed. Such pyrazines are accordingly useful in flavoring compositions and in flavor-enhancing compositions. A flavor-enhancing composition is taken to mean one which contributes a part of the overall flavor impression by supplementing or fortifying a natural or artificial flavor in a material.

When the pyrazines of this invention are used in a flavoring or a flavor-enhancing composition, they can be combined with conventional flavoring materials including organic acids such as fatty, saturated, unsaturated, and amino acids; alcohols, including primary and secondary alcohols; esters; carbonyl compounds including ketones and aldehydes; lactones; other cyclic organic materials including benzene derivatives, alicyclics, heterocyclics such as furans, pyridines, other pyrazines and the like; sulfur-containing materials including thiols, sulfides, disulfides and the like; proteins; lipids, carbohydrates; so-called flavor potentiators such as mono-sodium glutamate, guanylates, and inosinates; natural flavoring materials such as cocoa, vanilla, and caramel; artificial flavoring materials such as vanillin; and the like.

It will be appreciated that the types and amounts of materials selected from the foregoing groups of materials will depend upon the precise organoleptic character desired in the finished product and, especially in the case of flavoring compositions used to enhance other flavors, will vary according to the foodstuff to which flavor and aroma are to be imparted. Inorganic materials such as sodium chloride and freshness preservers such as butylated hydroxyanisole and propyl gallate can be added for their adjuvant or preservative effects on the flavoring composition.

The pyrazines, or the compositions incorporating them as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenen, other gums, and the like. The pyrazines can be incorporated with the carriers by conventional means such as spray-drying, and the like. Such carriers can also include materials for coacervating the pyrazines (and other flavoring ingredients( as present) to provide encapsulated products. When the carrier is an emulsion, the flavoring composition can also contain emulsifiers such as mono- and diglycerides of fatty acids and the like. With these carriers or vehicles the desired physical form of the composition can be prepared.

It will be understood by those skilled in the art that the pyrazines according to this invention can be added to the materials to be flavored at any convenient point in the production of the finished product. Thus, when the pyrazines are used to alter or otherwise vary the flavor of a foodstuff, they can be added in the original mixture, dough, emulsion, batter, or the like prior to any cooking or heating operation. Alternatively, they can be added at a later stage of processing if volatilization losses would be excessive during the earlier processing.

When the materials are used to treat tobacco products, for example, the additives can be applied in a suitable manner by spraying, dipping, or otherwise. The pyrazines can be appled to the "casing" or final spray treatment of the tobacco, or they can be applied at some earlier stage of curing. The quantity of pyrazines or mixtures thereof utilized should be sufficient to impart the desired flavor characteristic to the product, but on the other hand, the use of an excessive amount of the pyrazines is not only wasteful and uneconomical but in some instances too large a quantity may unbalance the flavor or other organoleptic property of the product to be consumed. The quantity used will vary depending upon the ultimate foodstuff, tobacco product, or other consumable product; the quantity of flavor present initially in the product; the further process or treatment steps to which the product will be subjected; regional and other preference factors; the type of storage, if any, to which the product will be subjected; and the pre-consumption treatment, such as baking, frying, and so on, given to the product by the ultimate consumer.

It is accordingly preferred that the ultimate compositions contain from about 0.1 p.p.m. to about 100 p.p.m. More particularly, in food compositions it is desirable to use from about 5 to about 50 p.p.m. and in certan preferred embodiments of the invention, from about 10 to about 50 p.p.m. of the pyrazines are included in the finished product. On the other hand, tobacco compositions can contain as little as 0.1 p.p.m. and as much as 100 p.p.m., depending upon whether a cigarette tobacco, a pipe tobacco, a cigar tobacco, a chewing tobacco, or snuff is being prepared.

The amount of pyrazine or pyrazines to be utilized in flavoring or flavor-enhancing composition can be varied over a wde range depending upon a particular quality to be added to the foodstuff, tobacco, or other consumable material. Thus, amounts of one or more pyrazines according to the present invention from about 0.1 up to 80 or 90% can be incorporated in such compositions. It is generally found to be desirable to include from about 0.5 to about 25% of the oxycyclic pyrazines in such compositions.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 5-acetoxy-5,6,7,8-tetrahydroquinoxaline

A one-liter reaction flask fitted with an agitator, thermometer, reflux condenser and addition funnel is charged with 200 cc. of acetic acid, and 53.6 g. (0.4 mole) of 5,6,7,8-tetrahydroquinoxaline is added. The mixture is brought to 75° C. and 76.0 g. (0.4 mole) of 40% peracetic acid is added dropwise during 20 minutes, while the flask temperature is maintained at 75±1° C. with cooling. The yellow solution is then stirred at 75° C. for 45 minutes.

The flask contents are subjected to reduced pressure to remove the acetic acid, and the residue is refluxed with 400 ml. of acetic anhydride for 1½ hours. While the mixture is being heated up, it assumes a dark brown color. The acetic anhydride remaining is then removed under reduced pressure.

The flask contents are cooled to room temperature, and 500 ml. of ethyl ether is added. After adding one liter of water, the organic layer is decanted, and the aqueous layer is extracted thrice with 300 ml. portions of ethyl ether. The ether extracts are combined with the organic layer and washed successively with equal volumes of saturated aqueous sodium chloride solution, saturated aqueous sodium bicarbonate, and saturated aqueous sodium chloride solution. The washed material is dried over magnesium sulfate, and the ether is removed by evaporation to obtain 70.0 g. of crude product.

The material is re-extracted with 350 ml. of chloroform, the extract is dried over magnesium sulfate, and the chloroform is evaporated to obtain 1.5 g. of organic material, of which about one gram is the acetoxy derivative.

The organic material is distilled in a Vigreaux column at 128°–140° C. and 2.8–14 mm. Hg to obtain 1.0 g. of 5-acetoxy-5,6,7,8-tetrahydroquinoxaline.

The pale yellow liquid boils at 128–129° C. at 0.7 mm. Hg and has an $n^D_{25}$ of 1.5293. At the 200 p.p.m. level in beef broth it accentuates the brothy aroma. A 2 p.p.m. aqueous solution has a light popcorn flavor note, and a 10 p.p.m. aqueous solution has a popcorn flavor note with a light bitter aftertaste. In peanut butter, this material provides a light roast peanut flavor.

EXAMPLE II

Preparation of 5-hydroxy-5,6,7,8-tetrahydroquinoxaline

A 500 ml. flask fitted with a mechanical agitator and reflux condenser is charged with 1.5 g. of 5-acetoxy-5,6,7,8-tetrahydroquinoxaline and a solution of 12 ml. of 20% aqueous potassium hydroxide in 30 ml. of methanol. The flask contents are then refluxed for 1½ hours, and thereafter the methanol is stripped away under vacuum. Then 60 ml. of water is added, and the resulting liquid is extracted thrice with ethyl ether.

The ether extract is dried over magnesium sulfate, and the ether is stripped off. The 0.7 g. residue is dissolved in 4 ml. of petroleum ether containing a few drops of ethyl ether and held at 0° to −5° C. overnight. The liquid is decanted from the resulting precipitate.

The product is obtained after purification by vacuum distillation as a white solid melting at 64.8–66.0° C. Proton magnetic resonance (PMR) shows an absorption at 8.41 p.p.m. attributable to two aromatic protons; an absorption at 4.80 p.p.m. attributable to a proton substituent on a hydroxylated carbon atom adjacent to a pyrazine ring; an absorption at 4.08 p.p.m. attributable to a hydroxyl proton; an absorption at 3.00 p.p.m. attributable to protons in a methylene group adjacent to a pyrazine ring; and absorption at 2.40–1.70 p.p.m. attributable to the four protons in two methylene groups one carbon atom removed from a pyrazine ring. The odor of a 2 percent alcoholic solution has a fatty, nut-like note, and a 6 p.p.m. aqueous solution has a sweet flavor note.

Mass spectroscopy of the material shows a parent peak at 150 and other peaks at 94, 122, 121, and 39.

EXAMPLE III

Preparation of 5-oxo-5,6,7,8-tetrahydroquinoxaline

A mixture is prepared by combining 0.50 g. (3 millimoles) of 5-hydroxy-5,6,7,8-tetrahydroquinoxaline, 9 ml. of dimethyl sulfoxide, and 6 ml. of acetic anhydride, and the mixture is then permitted to stand at room temperature (23° C.) for 24 hours. At the end of this period the mixture is poured into 50 ml. of water and the aqueous layer is extracted thrice with 20 ml. portions of methylene chloride. The methylene chloride extracts are combined and acidified with 25 ml. of 20% sulfuric acid.

The aqueous layer is separated and washed once with an equal volume of ether. The aqueous layer is then made alkaline with a 20% aqueous potassium hydroxide solution and extracted three times with 15 ml. volumes of methylene chloride. The methylene chloride extract is dried over magnesium sulfate, and the solvent is evaporated.

The evaporation leaves 0.40 g. of 5-oxo-5,6,7,8-tetrahydroquinoxaline. This material is a yellow crystalline solid melting at 57.4–59.8° C. PMR shows absorption at 8.64 p.p.m. attributable to two aromatic protons; a triplet at 3.24 p.p.m. attributable to two protons on a methylene group interposed between a methylene group and a carbonyl group adjacent a pyrazine ring; a triplet at 2.84 p.p.m. attributable to two protons in a methylene group adjacent a pyrazine ring; and a quintet at 2.24 p.p.m. attributable to two protons on a methylene group intermediate a methylene group adjacent to a pyrazine ring and a methylene group adjacent to a carbonyl group substituent on a pyrazine ring. Mass spectral analysis of the oxo-material shows a parent peak at 148 and other peaks at 119, 92, 120, 41, 39 and 65.

Addition of this material to chicken broth at the 3 p.p.m. level deepens the parsley character. It can be used in spice flavors where light, spicy, earthy flavor notes are desired, e.g., paprika, nutmeg.

EXAMPLE IV

A cheddar cheese flavoring formulation is prepared by admixing the following ingredients in the amounts indicated:

| Ingredient: | Amount (parts) |
|---|---|
| Methyl hexyl ketone | 1.5 |
| Diacetyl | 14.2 |
| isoValeric acid | 40.8 |
| Hexanoic acid | 158.9 |
| Butyric acid | 244.8 |
| Caprylic acid | 534.8 |
| Acetyltetrahydroquinoxaline | 5.0 |

Produced in Example I

The foregoing cheese formula is incorporated into a bland cream cheese dip and evaluated. A good strong cheese note is imparted to the dip.

Similarly, other flavors can be improved by adding the acetoxy derivative prepared in Example I or the hydroxy and/or oxo derivatives of Example II and Example III.

What is claimed is:

1. A process for altering the flavor or aroma of a consumable material which comprises adding thereto a small but effective amount of at least one oxycyclic pyrazine of the formula

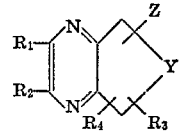

wherein Y is —$CH_2$— or —$CH_2$—$CH_2$—; Z is =O, an hydroxy group, or an alkanoyl group having from two to four carbon atoms; and $R_1$, $R_2$, $R_3$ and $R_4$ are the same or different and represent hydrogen or lower alkyl having one to three carbon atoms.

2. A process as defined in claim 1 wherein Y is —$CH_2$—$CH_2$—; Z is =O and $R_1$, $R_2$, $R_3$ and $R_4$ are hydrogen.

3. A process as defined in claim 1 wherein Y is —$CH_2$—$CH_2$; Z is hydroxy; and $R_1$, $R_2$, $R_3$, and $R_4$ are hydrogen.

4. A process as defined in claim 1 wherein Y is —$CH_2$—$CH_2$—; Z is acetyloxy and $R_1$, $R_2$, $R_3$ and $R_4$ are hydrogen.

5. A flavoring composition comprising at least one oxycyclic pyrazine of the formula

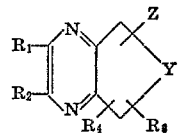

wherein Y is —$CH_2$— or —$CH_2$—$CH_2$—; Z is =O, an hydroxy group, or an alkanoyl group having from two to four carbon atoms; and $R_1$, $R_2$, $R_3$ and $R_4$ are the same or different and represent hydrogen or lower alkyl having one to three carbon atoms.

References Cited

FOREIGN PATENTS 6812899  3/1969  Netherlands.

OTHER REFERENCES

Sax: "Dangerous Properties of Industrial Materials," 3rd ed. Reinhold Book Corp., N.Y. (1969), p. 934.

"Condensed Chemical Dictionary," 8th ed., Van Nostrand Reinhold Co., N.Y. (1971), pp. 619 and 622.

Henderson et al.: "Noxious Gasses," Chemical Catalog Co., Inc., New York (1927), pp. 134–136.

MORRIS O. WOLK, Primary Examiner

S. MARANTZ, Assistant Examiner

U.S. Cl. X.R.

131—17, 144; 260—250 R

UNITED STATES PATENT OFFICE
CERTIFICATE OF CORRECTION

Patent No. 3,764,349            Dated October 9, 1973

Inventor(s) BRAJA D. MOOKHERJEE et al

It is certified that error appears in the above-identified patent and that said Letters Patent are hereby corrected as shown below:

Page 2, line 7, after "or" correct the formula to read: $-CH_2-CH_2-$.

Signed and sealed this 23rd day of April 1974.

(SEAL)
Attest:

EDWARD M. FLETCHER, JR.           C. MARSHALL DANN
Attesting Officer                    Commissioner of Patents